US012560494B2

(12) United States Patent
Koh et al.

(10) Patent No.: US 12,560,494 B2
(45) Date of Patent: Feb. 24, 2026

(54) METHOD AND APPARATUS FOR PREDICTING TEMPERATURE OF HEAT SINK, AND METHOD FOR MEASURING JUNCTION TEMPERATURE OF POWER MODULE USING THEREOF

(71) Applicants: Hyundai Motor Company, Seoul (KR); Kia Corporation, Seoul (KR)

(72) Inventors: Yeongju Koh, Suncheon-Si (KR); Seong Min Lee, Seoul (KR); Sangcheol Shin, Suwon-Si (KR); JeHwan Lee, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 502 days.

(21) Appl. No.: 18/102,273

(22) Filed: Jan. 27, 2023

(65) Prior Publication Data

US 2024/0142317 A1 May 2, 2024

(30) Foreign Application Priority Data

Oct. 26, 2022 (KR) ........................ 10-2022-0139472

(51) Int. Cl.
*G01K 7/42* (2006.01)
*G01K 7/24* (2006.01)
(52) U.S. Cl.
CPC ................. *G01K 7/42* (2013.01); *G01K 7/24* (2013.01)
(58) Field of Classification Search
CPC .. G01K 7/42; G01K 7/24; G01K 7/22; G01K 7/427; G01K 7/16; G01K 15/005; G01K 2217/00; G01R 21/00
See application file for complete search history.

(56) References Cited

U.S. PATENT DOCUMENTS

2019/0250205 A1* 8/2019 Sarwar .................. H01L 25/072

FOREIGN PATENT DOCUMENTS

| KR | 10-2018-0084402 A | | 7/2018 | |
| KR | 20190089659 | * | 7/2019 | ............... G01K 7/22 |
| KR | 20210028363 | * | 9/2019 | .......... H02M 1/4225 |

OTHER PUBLICATIONS

Adam Hoover, "Load Switch Thermal Considerations", Application Report, Texas Instruments, Jul. 2014—Revised Oct. 2018, 8 pages.*
"Using the NTC inside a power electronic module", Application Note AN2009-10, Infineon Technologies AG, 2009, 10 pages.*

* cited by examiner

*Primary Examiner* — Alexander Satanovsky
(74) *Attorney, Agent, or Firm* — MORGAN, LEWIS & BOCKIUS LLP

(57) ABSTRACT

A method for predicting a temperature of a heat sink for cooling a power module including at least one switching element and a Negative Temperature Coefficient of Resistance (NTC) sensor is provided. The method for predicting a temperature of a heat sink includes: estimating a temperature variation of the NTC sensor using a power loss of the power module based on a power loss occurring in the at least one switching element according to driving of the power module and a thermal resistance of the power module; obtaining a temperature of the power module detected by the NTC sensor; and predicting the temperature of the heat sink from a difference between the temperature of the power module and the temperature variation of the NTC sensor.

14 Claims, 9 Drawing Sheets

FIG. 4

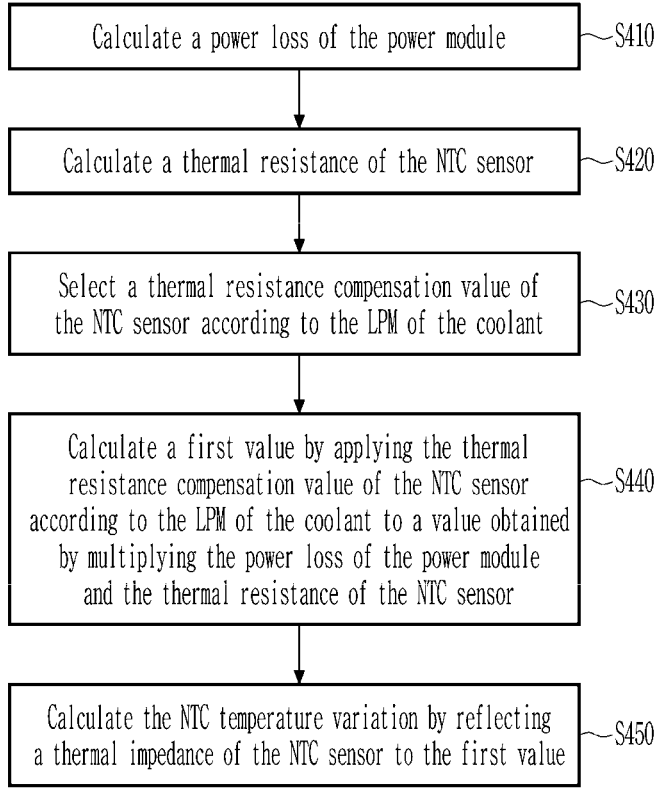

Calculate a power loss of the power module ~S410

Calculate a thermal resistance of the NTC sensor ~S420

Select a thermal resistance compensation value of the NTC sensor according to the LPM of the coolant ~S430

Calculate a first value by applying the thermal resistance compensation value of the NTC sensor according to the LPM of the coolant to a value obtained by multiplying the power loss of the power module and the thermal resistance of the NTC sensor ~S440

Calculate the NTC temperature variation by reflecting a thermal impedance of the NTC sensor to the first value ~S450

Measurement 1: $\Delta T_{SIC}$                    Measurement 2: $\Delta T_{NTC}$ Calculate the temperature of the heat sink using the NTC sensor ~S810

Calculate the variation of the junction temperature of the power module by using the thermal model of the power module ~S820

Calculate the junction temperature of the power module using the variation of the junction temperature of the power module and the temperature of the heat sink ~S830

METHOD AND APPARATUS FOR PREDICTING TEMPERATURE OF HEAT SINK, AND METHOD FOR MEASURING JUNCTION TEMPERATURE OF POWER MODULE USING THEREOF

CROSS-REFERENCE TO RELATED APPLICATION

The present application claims priority to Korean Patent Application No. 10-2022-0139472 filed on Oct. 26, 2022, the entire contents of which is incorporated herein for all purposes by this reference.

BACKGROUND OF THE PRESENT DISCLOSURE

Field of the Present Disclosure

The present disclosure relates to a method and apparatus of predicting a temperature of a heat sink, and a method for measuring a junction temperature of a power module using the thereof. More particularly, the present disclosure relates to a method and apparatus of predicting a temperature of a heat sink using a Negative Temperature Coefficient of Resistance (NTC) sensor, and a method for measuring a junction temperature of a power module using the predicted temperature of the heat sink.

Description of Related Art

The inverter applies AC power to the motor from DC power of a battery. In a process of converting DC power to AC power, the switching element switches at a high speed, and at the instant time, a lot of heat is generated due to power loss occurring in the switching element.

If the junction temperature of the switching element rises significantly and becomes higher than the rating of the switching element, it may lead to burnout of the switching element. Thus, it is necessary to limit the temperature of the switching element so that it does not rise above a certain temperature.

In the case of a conventional insulated gate bipolar transistor (IGBT) power module, it is possible to directly detect the temperature because there is a diode temperature sensor inside the switching element. However, recently, as a silicon carbide (SIC) power module is used, the NTC sensor is used inside the power module, not inside the switching element. At the instant time, the change in the junction temperature of the switching element may be calculated using the measured temperature of the NTC sensor and thermal model, but it is impossible to accurately estimate the junction temperature without the temperature of the coolant.

In general, the temperature of the coolant is estimated using a temperature sensor attached to the cooler. However, because the present temperature sensor is attached on the outside of the cooler, it may be affected by the external temperature, and as a result, it may not be able to accurately measure the temperature of the heat sink located at the junction of the power module and cooler.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of predicting a temperature of a heat sink for predicting a heat sink temperature using an NTC sensor in a power module without using a temperature sensor attached to a cooler.

Furthermore, the present disclosure has been made in an effort to provide a method for measuring a junction temperature of a power module for more accurately measuring a junction temperature using a heat sink temperature predicted using an NTC sensor.

According to an exemplary embodiment of the present disclosure, a method for predicting a temperature of a heat sink located under a substrate on which a power module including at least one switching element and a Negative Temperature Coefficient of Resistance (NTC) sensor is attached is provided. The method for predicting a temperature of a heat sink includes: estimating a temperature variation of the NTC sensor using a power loss of the power module based on a power loss occurring in the at least one switching element according to driving of the power module and a thermal resistance of the power module; obtaining a temperature of the power module detected by the NTC sensor; and predicting the temperature of the heat sink from a difference between the temperature of the power module and the temperature variation of the NTC sensor.

The estimating the temperature variation of the NTC sensor may include: determining a thermal resistance of the NTC sensor using the thermal resistance of the power module; and determining the temperature variation of the NTC sensor by use of the power loss of the power module, the thermal resistance of the NTC sensor, and a thermal resistance compensation value of the NTC sensor.

The estimating the temperature variation of the NTC sensor may further include selecting the thermal resistance compensation value of the NTC sensor according to a Liter Per Minute (LPM) of a coolant.

The determining the temperature variation of the NTC sensor may include: determining a first value by applying the thermal resistance compensation value to a second value obtained by multiplying the power loss of the power module and the thermal resistance of the NTC sensor; and determining the temperature variation of the NTC sensor by applying a thermal impedance of the NTC sensor to the first value.

The determining the thermal resistance of the NTC sensor may include determining the thermal resistance of the NTC sensor by applying a temperature reflection rate to the thermal resistance of the power module, and the temperature reflection rate may depend on a ratio between the temperature variation of the NTC sensor and the junction temperature variation of the power module, measured after heating of the at least one switching element while the temperature of the coolant is fixed.

The predicting the temperature of the heat sink may include determining the temperature of the heat sink by applying an impedance of a coolant in the heat sink to the difference between the temperature of the power module and the temperature variation of the NTC sensor.

According to another exemplary embodiment of the present disclosure, an apparatus of predicting a temperature of a heat sink for cooling a power module including at least one switching element and a Negative Temperature Coefficient of Resistance (NTC) sensor is provided. The apparatus of predicting a temperature of a heat sink includes: an NTC temperature variation calculator that is configured to estimate a temperature variation of the NTC sensor using a power loss of the power module based on a power loss occurring in the at least one switching element according to driving of the power module and a thermal resistance of the power module; an NTC temperature obtainer that is configured to obtain a temperature of the power module detected by the NTC sensor; and a heatsink temperature calculator that is configured to predict the temperature of the heat sink from a difference between the temperature of the power module and the temperature variation of the NTC sensor.

The NTC temperature variation calculator may determine a thermal resistance of the NTC sensor using the thermal resistance of the power module, may select a thermal resistance compensation value of the NTC sensor according to a Liter Per Minute (LPM) of the coolant, and may determine the temperature variation of the NTC sensor by use of the power loss of the power module, the thermal resistance of the NTC sensor, and the thermal resistance compensation value of the NTC sensor.

The NTC temperature variation calculator may determine a first value by applying the thermal resistance compensation value to a second value obtained by multiplying the power loss of the power module and the thermal resistance of the NTC sensor, and may determine the temperature variation of the NTC sensor by applying a thermal impedance of the NTC sensor to the first value.

The NTC temperature variation calculator may determine the thermal resistance of the NTC sensor by applying a temperature reflection rate to the thermal resistance of the power module, and the temperature reflection rate may depend on a ratio between the temperature variation of the NTC sensor and the junction temperature variation of the power module, measured after heating of the at least one switching element while the temperature of the coolant is fixed.

The heatsink temperature calculator may determine the temperature of the heat sink by applying an impedance of a coolant in the heat sink to the difference between the temperature of the power module and the temperature variation of the NTC sensor.

According to various exemplary embodiments of the present disclosure, a method for measuring a junction temperature of a power module including at least one switching element and a Negative Temperature Coefficient of Resistance (NTC) sensor in apparatus for measuring a junction temperature of a power module is provided. The method for measuring a junction temperature of a power module includes: estimating a temperature of a heat sink using a temperature of the power module detected by the NTC sensor and a temperature variation of the NTC sensor; determining a variation of a junction temperature of the power module using a thermal model of the power module; and determining the junction temperature of the power module using the temperature of the heat sink and the variation of the junction temperature of the power module.

The estimating the temperature of the heat sink may include: determining a power loss of the power module based on the power loss generated in the at least one switching element according to driving of the power module; determining a thermal resistance of the power module; determining a thermal resistance of the NTC sensor using the thermal resistance of the power module; selecting a thermal resistance compensation value of the NTC sensor according to a Liter Per Minute (LPM) of a coolant; and determining the temperature variation of the NTC sensor by use of the power loss of the power module, the thermal resistance of the NTC sensor, and the thermal resistance compensation value of the NTC sensor.

The determining the temperature variation of the NTC sensor may include: determining a first value by applying the thermal resistance compensation value to a second value obtained by multiplying the power loss of the power module and the thermal resistance of the NTC sensor; and determining the temperature variation of the NTC sensor by applying a thermal impedance of the NTC sensor to the first value.

The estimating the temperature of the heat sink may include determining the temperature of the heat sink by applying an impedance of a coolant in the heat sink to the difference between the temperature of the power module and the temperature variation of the NTC sensor.

The determining a variation of a junction temperature of the power module may include determining the variation of the junction temperature of the power module using a power loss of the power module determined based on the power loss generated in the at least one switching element according to the driving of the power module and a thermal resistance of the power module.

According to the exemplary embodiment of the present disclosure, by predicting the temperature of the heat sink using the NTC sensor inside the power module without a temperature sensor attached outside the cooler to measure the temperature of the coolant, the influence of the external temperature may be excluded, so that the temperature of the heat sink may be predicted more accurately. Furthermore, it is possible to remove the temperature sensor for measuring the temperature of the coolant, reducing the manufacturing cost and reducing the space loss caused by attaching the temperature sensor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a flowchart illustrating a method of determining an NTC temperature change amount by an NTC temperature variation calculator shown in FIG. 2.

Figure 1:
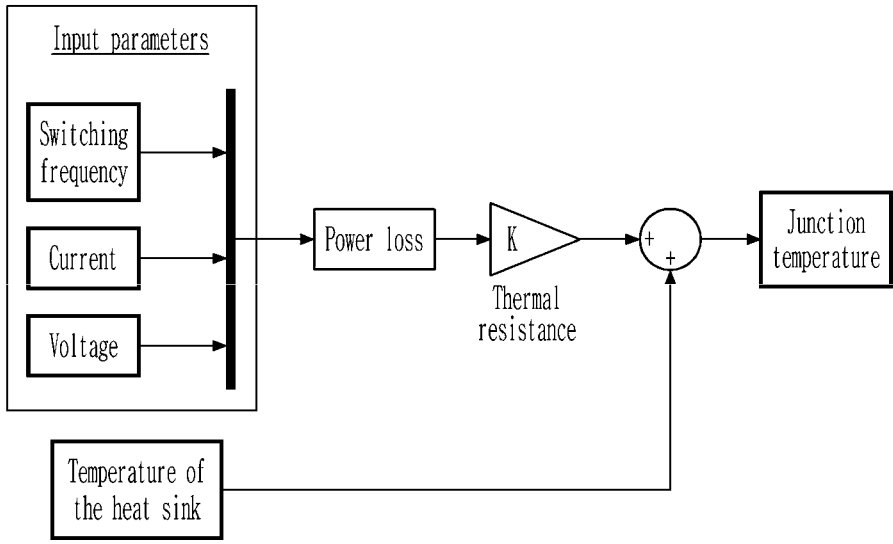
FIG. 1 is a diagram schematically illustrating a method for estimating a junction temperature of a power module using a general thermal model.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the appended drawings so that a person of ordinary skill in the art may easily implement the present disclosure. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Throughout the specification, when an element is referred to be "connected" with another element, it includes not only the case where two elements are "directly connected" but also the case where two elements are "electrically or mechanically connected" with another component interposed therebetween.

In the present specification, terms including an ordinal number, such as first, second, etc., may be used to describe various elements, but the elements are not limited by the terms. The above terms are used only for distinguishing one element from another element. For example, without departing from the scope of the present disclosure, a first element may be referred to as a second element, and similarly, a second element may be referred to as a first element.

In the flowchart described with reference to the drawings in the present specification, the order of operations may be changed, several operations may be merged, some operations may be divided, and specific operations may not be performed.

Furthermore, in the present specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus of predicting a temperature of a heat sink, and a method for measuring a junction temperature of a power module using the thereof will be described in detail with reference to the drawings.

FIG. 1 is a diagram schematically illustrating a method for estimating a junction temperature of a power module using a general thermal model.

Referring to FIG. 1, the junction temperature of the power module may be determined from the power loss of the power module, thermal resistance of the power module, and the temperature of the heat sink as shown in Equation 1.

> the junction temperature of the power module=power loss of the power module+thermal resistance of the power module+temperature of the heat sink    (Equation 1)

The power module is located on a substrate, and a heat sink including a coolant passage is located under the substrate. The coolant flows through the coolant passage, and the coolant cools the semiconductor switching element in the power module.

When the input parameters of the power module including the switching frequency, input voltage, input current, and driving mode are determined, the power loss of the power module may be determined while the power module is driven.

The power loss of the power module may be determined as the sum of the conduction loss occurring when the current of each semiconductor switching element in the power module conducts and the switching loss occurring when each semiconductor switching element is switched. The sum of the conduction loss and the switching loss of the semiconductor switching element is called the power loss of the semiconductor switching element. The conduction loss and the switching loss of the switching element may be determined by a preset conduction loss determination formula and a switching loss determination formula.

The power loss of the power module may be set in consideration of various factors according to the characteristics of the inverter to which the power module is applied. The power loss of the power module may be determined in various ways depending on the company that manufactures the power module or the company that manufactures products such as vehicles by applying the power module, and a detailed description thereof will be omitted.

Thermal resistance may be expressed as a value obtained by dividing the temperature variation by the power consumption. Each element forming the power module has a thermal resistance component, and the thermal resistance is a value representing thermal performance and is affected by the heat dissipation performance of the cooling substrate of the power module or the cooler.

To measure the thermal resistance of a semiconductor switching element, which is an element of a power module, a relationship between a parasitic diode voltage and a temperature is used. The parasitic diode voltage has a characteristic of being inversely proportional to the temperature. Since the gate voltage varies depending on the gate charging degree of each semiconductor switching element, a voltage of −9 V is applied to the gate electrode, and the parasitic diode voltage is measured while increasing the temperature of the coolant. At the instant time, a slope called a K-factor is obtained by dividing the voltage variation by the temperature variation (mV/K). Using the K-factor thus obtained, the temperature variation may be obtained through the voltage variation. A voltage applied to the semiconductor switching element is measured through a measuring device, and as a result, thermal resistance may be obtained.

The value obtained by multiplying the thermal resistance of the power module and the power loss means the variation of the junction temperature of the power module. Therefore, when the temperature of the heat sink is added to the variation of the junction temperature, the junction temperature of the power module is determined. At the instant time, the maximum junction temperature is designed to not exceed 140 degrees Celsius in consideration of the temperature margin.

The heatsink temperature may be measured from the temperature of the coolant.

The existing IGBT power module includes a temperature sensor inside the IGBT. Therefore, the temperature of the power module may be directly detected without a calculation, and when necessary, the temperature of the coolant may be estimated and used by use of a thermal model.

On the other hand, in the case of the SIC power module, there is no temperature sensor inside the semiconductor switching element, but an NTC sensor outside the semiconductor switching element. In the instant case, the temperature of the coolant is estimated using a temperature sensor attached to the cooler. However, since the temperature sensor is attached on the outside of the cooler, it may be affected by the external temperature, and as a result, the temperature of the heat sink may not be accurately measured. That is, it is impossible to predict the temperature of the coolant and the temperature of the power module without separate logic, and it is difficult to manage the temperature of the power module below 140 degrees.

The method and apparatus of predicting a temperature of a heat sink according to an exemplary embodiment of the present disclosure predicts the temperature of the heat sink using the NTC sensor in the power module without a temperature sensor attached outside the cooler.

Figure 2:
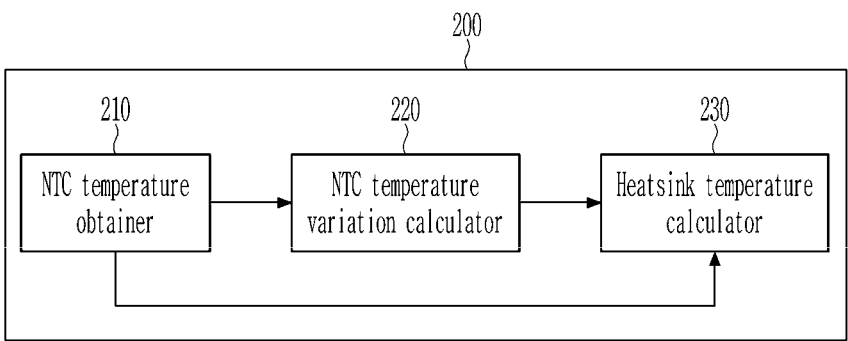
FIG. 2 is a diagram illustrating an apparatus of predicting a temperature of a heat sink according to an exemplary embodiment of the present disclosure.
Figure 3:
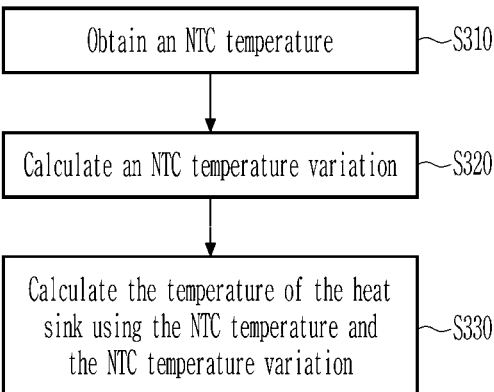
FIG. 3 is a flowchart illustrating a method for predicting a temperature of a heat sink shown in FIG. 2.

FIG. 2 is a diagram illustrating an apparatus of predicting a temperature of a heat sink according to an exemplary embodiment of the present disclosure, and FIG. 3 is a flowchart illustrating a method for predicting a temperature of a heat sink shown in FIG. 2.

Referring to FIG. 2, the apparatus of predicting a temperature of a heat sink 200 includes an NTC temperature obtainer 210, an NTC temperature variation calculator 220, and a heatsink temperature calculator 230.

Referring to FIG. 2 and FIG. 3, the NTC temperature obtainer 210 obtains an NTC temperature, that is, the temperature of the power module detected by the NTC sensor (S310). The temperature of the power module detected by the NTC sensor is called NTC temperature for convenience. The NTC temperature obtainer 210 may include an NTC sensor for detecting the temperature of the power module.

The NTC temperature variation calculator 220 determines an NTC temperature variation (S320). The NTC temperature variation means the temperature variation of the power module detected by the NTC sensor. The NTC temperature variation may be determined as in Equation 2.

$$\Delta T_{NTC} = P_{Loss} * R_{thNTC} * R_{thrate} * Z_{thNTC} \qquad \text{(Equation 2)}$$

$\Delta T_{NTC}$ represents the NTC temperature variation, and $P_{Loss}$ represents the power loss of the power module. $R_{thNTC}$ represents the thermal resistance of the NTC sensor, $R_{thrate}$ represents the thermal resistance compensation value of the NTC sensor according to the flow rate (LPM: Liter Per Minute) of the coolant, and $Z_{thNTC}$ represents the thermal impedance of the NTC sensor. The * indicates multiplication.

The heat sink temperature calculator 230 determines the temperature of the heat sink using the NTC temperature obtained by the NTC temperature obtainer 210 and the NTC temperature variation determined by the NTC temperature variation calculator 220 (S330). The heat sink temperature calculator 230 may determine the temperature of the heat sink by use of a value obtained by subtracting the NTC temperature variation from the NTC temperature as shown in Equation 3.

$$T_{sink} = T_{NTC} - \Delta T_{NTC})^* Z_{thwater} \qquad \text{(Equation 3)}$$

In Equation 3, $T_{sink}$ represents the temperature of the heat sink, and $T_{NTC}$ represents the NTC temperature. $Z^{thwater}$ represents the impedance of the coolant.

If the actual NTC temperature variation and the NTC temperature variation determined by the NTC temperature variation calculator 220 completely match, $Z_{thwater}$ is not required. However, a difference may occur between the measured value and the theoretical value, and a temperature ripple may occur due to the difference. Accordingly, the heat sink temperature calculator 230 applies the impedance of the coolant to remove a temperature ripple due to a difference between the measured value and the theoretical value. That is, the heat sink temperature calculator 230 applies the impedance of the coolant to a value obtained by subtracting the NTC temperature variation from the NTC temperature, and finally determines the temperature of the heat sink.

FIG. 4 is a flowchart illustrating a method of determining an NTC temperature change amount by an NTC temperature variation calculator shown in FIG. 2.

Referring to FIG. 4, when the input parameters of the power module including the switching frequency, input voltage, input current, driving mode, etc. are determined, the NTC temperature variation calculator 220 determines a power loss of the power module by driving the inverter according to the input parameters (S410).

Next, the NTC temperature variation calculator 220 determines a thermal resistance of the NTC sensor (S420). The thermal resistance of the NTC sensor has a relationship in which a constant temperature reflection rate is applied to the thermal resistance of the power module. Accordingly, the thermal resistance $R_{thNTC}$ of the NTC sensor may be determined as in Equation 4.

$$R_{thNTC} = R_{th} * k \qquad \text{(Equation 4)}$$

In Equation 4, $R_{thNTC}$ represents the thermal resistance of the NTC sensor, $R_{th}$ represents the thermal resistance of the power module, and k represents the temperature reflection rate. That is, the thermal resistance of the NTC sensor has a relationship k times that of the thermal resistance of the power module.

Meanwhile, the temperature detected by the NTC sensor varies depending on LPM of the coolant flowing through the coolant passage in the heat sink. The NTC temperature variation calculator 220 selects a thermal resistance compensation value of the NTC sensor according to the LPM of the coolant to be used to determine the NTC temperature variation (S430).

After the thermal resistance of the NTC sensor is determined, the NTC temperature variation calculator 220 determines a first value by applying the thermal resistance compensation value of the NTC sensor according to the LPM of the coolant to a value obtained by multiplying the power loss of the power module and the thermal resistance of the NTC sensor as shown in Equation 2 (S440).

There is a thermal impedance which is a function of time that represents thermal resistance. That is, because the rate of temperature increase and/or decrease depends on the thermal impedance varies, the NTC temperature variation calculator 220 additionally reflects a thermal impedance of the NTC sensor to the first value obtained in step S440, and finally determines the NTC temperature variation (S450).

Figure 5:
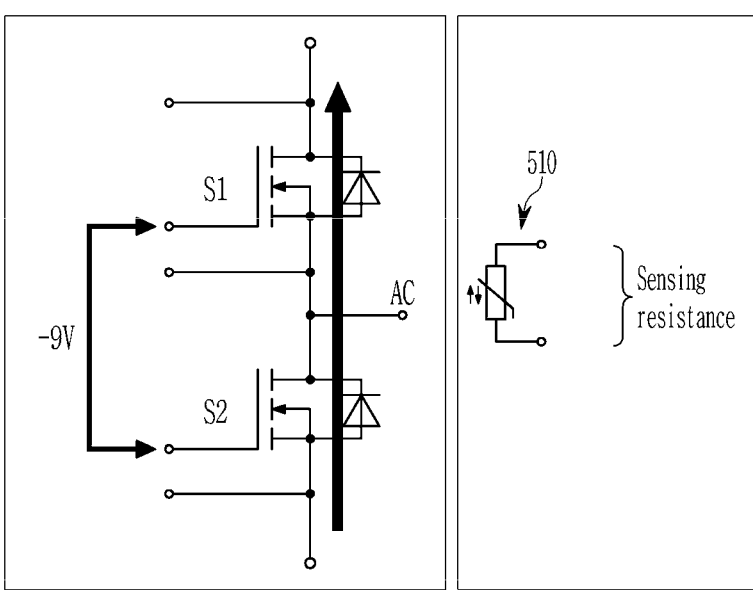
FIG. 5 is a diagram illustrating a method for determining a temperature reflection rate indicating a relationship between the thermal resistance of the power module and the thermal resistance of the NTC sensor.

FIG. 5 is a diagram illustrating a method for determining a temperature reflection rate indicating a relationship between the thermal resistance of the power module and the thermal resistance of the NTC sensor.

Referring to FIG. 5, the power module includes a plurality of semiconductor switching elements S1 and S2 and an NTC sensor 510. FIG. 5 shows two semiconductor switching elements S1 and S2 for convenience.

When the power module is driven, the two semiconductor switching elements S1 and S2 operate complementarily.

The NTC sensor 510 detects the temperature of the power module.

The NTC temperature variation calculator 220 simultaneously applies a voltage of −9 V to the gate electrodes of the plurality of semiconductor switching elements S1 and S2 to determine the temperature reflection factor k shown in Equation 4. Accordingly, the semiconductor switching elements S1 and S2 are simultaneously heated, and the NTC temperature variation calculator 220 measures the parasitic diode voltage.

The NTC temperature variation calculator 220 measures the junction temperature variation $\Delta T_{SIC}$ of the power module through the variation of the parasitic diode voltage, detects the resistance of the NTC sensor, and measures the temperature variation $\Delta T_{NTC}$ of the NTC sensor. At the instant time, unlike before, the junction temperature variation $\Delta T_{SIC}$ and the temperature variation of the NTC sensor $\Delta T_{NTC}$ are measured while the temperature of the coolant is fixed.

The NTC temperature variation calculator 220 may determine the temperature reflection factor k representing the relationship between the thermal resistance of the power module and the thermal resistance of the NTC sensor by dividing the temperature variation $\Delta T_{NTC}$ of the NTC sensor by the junction temperature variation $\Delta T_{SIC}$ of the power module, as shown in Equation 5.

$$k = \Delta T_{NTC} / \Delta T_{SIC} \qquad \text{(Equation 5)}$$

As shown in Equation 5, the temperature reflection rate k may be determined as a ratio of the temperature variation $\Delta T_{NTC}$ of the NTC sensor and the junction temperature variation $\Delta T_{SIC}$ of the power module through a test.

Figure 6:
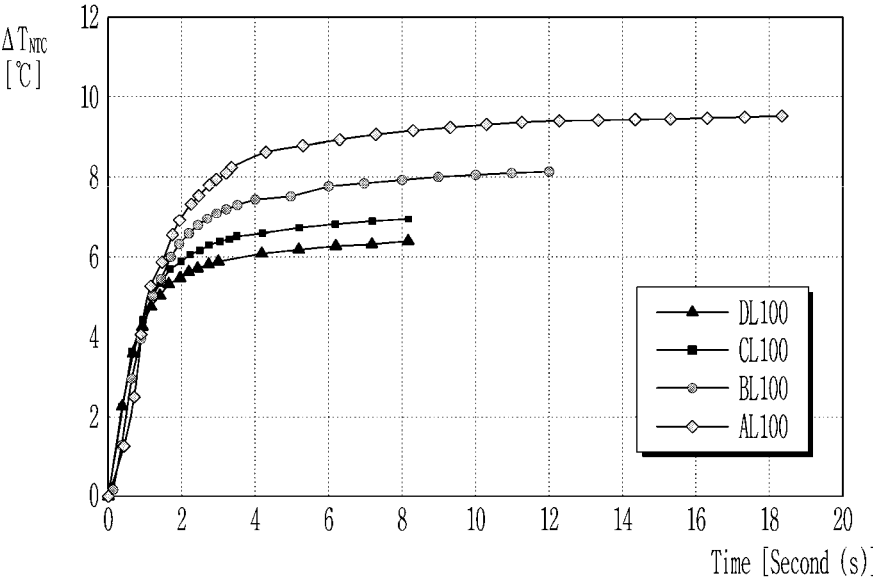
FIG. 6 is a graph showing the temperature change of the NTC sensor for each LPM of the coolant.

FIG. 6 is a graph showing the temperature change of the NTC sensor for each LPM of the coolant. In FIG. 6, AL100 means that the LPM of the coolant is "A" LPM and a current of 100 A is applied to the power module. Here, A, B, C, and D may be natural numbers of 1 or more, may have a relationship of A<B<C<D, and D may be the maximum LPM.

As shown in FIG. 6, the change rate in temperature varies according to the LPM of the coolant of the vehicle. As the LPM of the coolant increases, the heat dissipation performance is improved, so that the thermal resistance is lowered, and the temperature variation of the NTC sensor is also reduced.

That is, since the thermal resistance value may vary according to the heat dissipation characteristics, the thermal resistance compensation value according to the LPM of the coolant may be reflected in the thermal resistance of the NTC sensor. To the present end, the thermal resistance measurement test according to the application of the above-described input parameters is performed while changing the LPM of the coolant, and the thermal resistance corresponding to each LPM of the coolant is derived.

Next, a thermal resistance compensation value for each LPM of the coolant may be determined based on the maximum LPM.

The NTC temperature variation calculator 220 selects a thermal resistance compensation value of the NTC sensor according to the LPM of the coolant applied to the power module from among the thermal resistance compensation values for each LPM of the coolant.

Next, the NTC temperature variation calculator 220 may reflect the thermal resistance compensation value according to the selected LPM of the coolant to the value obtained by multiplying the power loss of the power module and the thermal resistance of the NTC sensor.

Figure 7:
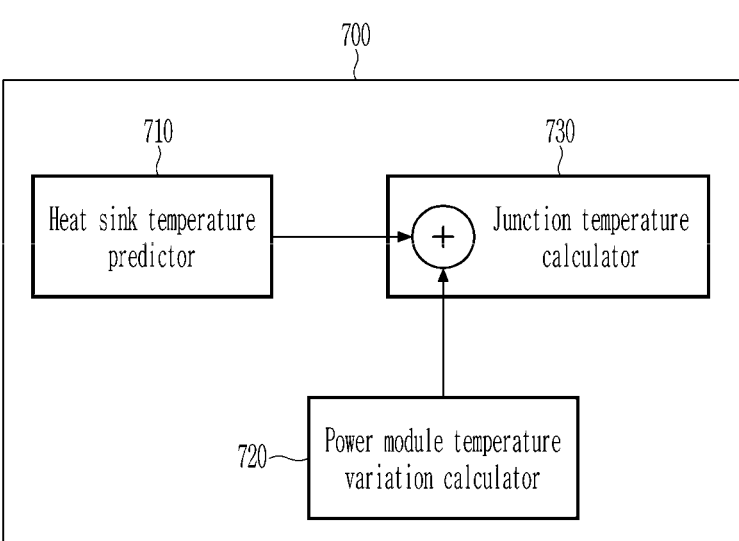
FIG. 7 is a diagram illustrating an apparatus of measuring a junction temperature of a power module according to an exemplary embodiment of the present disclosure.
Figure 8:
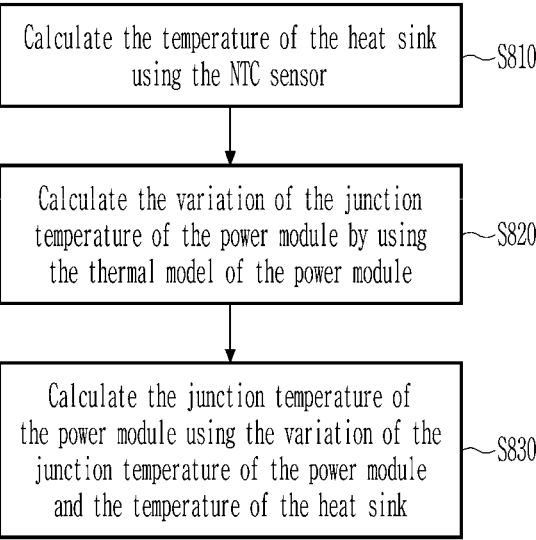
FIG. 8 is a flowchart illustrating a method for measuring a junction temperature of the apparatus of measuring a junction temperature of a power module shown in FIG. 7.
Figure 9:
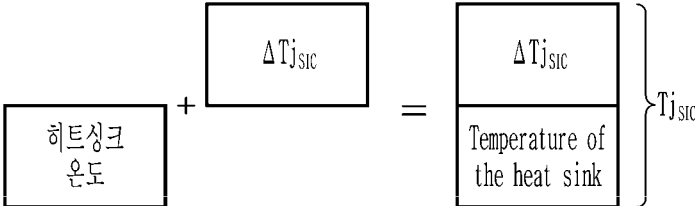
FIG. 9 is a conceptual diagram of a method for determining a junction temperature of a power module according to an exemplary embodiment of the present disclosure.

FIG. 7 is a diagram illustrating an apparatus of measuring a junction temperature of a power module according to an exemplary embodiment of the present disclosure, and FIG. 8 is a flowchart illustrating a method for measuring a junction temperature of the apparatus of measuring a junction temperature of a power module shown in FIG. 7. Furthermore, FIG. 9 is a conceptual diagram of a method for determining a junction temperature of a power module according to an exemplary embodiment of the present disclosure.

Referring to FIG. 7, the apparatus 700 for measuring a junction temperature of a power module includes a heat sink temperature predictor 710, a power module temperature variation calculator 720, and a junction temperature calculator 730.

Referring to FIGS. 7 and 8, the heat sink temperature predictor 710 corresponds to the apparatus of predicting a temperature of a heat sink 200 described above. The apparatus of predicting a temperature of a heat sink 200 determines the temperature of the heat sink using the NTC sensor in the same manner as described above (S810).

The power module temperature variation calculator 720 determines the variation of the junction temperature of the power module by use of the thermal model of the power module (S820). The variation of the junction temperature of the power module may be determined as the value obtained by multiplying the power loss of the power module and the thermal resistance of the power module.

The junction temperature calculator 730 determines the junction temperature of the power module based on the variation of the junction temperature of the power module and the temperature of the heat sink determined by the heat sink temperature predictor 710 as shown in Equation 1 (S830).

As shown in FIG. 9, the junction temperature calculator 730 may determine the junction temperature $Tj_{SIC}$ of the power module by adding the junction temperature variation $\Delta Tj_{SIC}$ of the power module to the heat sink temperature.

Accordingly, according to an exemplary embodiment of the present disclosure, the temperature of the heat sink may be predicted using only the NTC sensor through the apparatus for predicting a temperature of a heat sink 200, and the junction temperature of the power module is determined using the predicted temperature of the heat sink temperature. It is possible to remove the temperature sensor provided outside to measure the temperature of the coolant temperature, and it is possible to secure space and reduce cost by removing the temperature sensor.

Furthermore, by use of the NTC sensor, because it is not affected by external temperature changes, it is possible to improve the prediction accuracy of the temperature of the heat sink.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for predicting a temperature of a heat sink located under a substrate on which a power module including at least one semiconductor switching element and a Negative Temperature Coefficient of Resistance (NTC) sensor is attached, the method comprising:

calculating, by an NTC temperature variation calculator of an apparatus for predicting the temperature of the heat sink, a thermal resistance of the power module using parasitic diode voltages of the at least one semiconductor switching element measured while applying a voltage set to a gate electrode of the at least one semiconductor switching element and increasing a coolant temperature;

calculating, by the NTC temperature variation calculator, a thermal resistance of the NTC sensor using the thermal resistance of the power module; estimating, by the NTC temperature variation calculator, a temperature variation of the NTC sensor using a power loss of the power module based on a power loss occurring in the at least one semiconductor switching element according to driving of the power module and the thermal resistance of the NTC sensor, and a thermal resistance compensation value of the NTC sensor;

predicting, by a heatsink temperature calculator of the apparatus, the temperature of the heat sink from a difference between a temperature of the power module detected by the NTC sensor and the temperature variation of the NTC sensor.

2. The method of claim 1, wherein the estimating the temperature variation of the NTC sensor further includes:

selecting, from among a plurality of thermal resistance compensation values for a plurality of coolant LPMs, the thermal resistance compensation value of the NTC sensor according to a Liter Per Minute (LPM) of a coolant applied to the power module.

3. The method of claim 1, wherein the estimating the temperature variation of the NTC sensor includes:

determining a first value by applying the thermal resistance compensation value to a second value obtained by multiplying the power loss of the power module and the thermal resistance of the NTC sensor; and determining the temperature variation of the NTC sensor by applying a thermal impedance of the NTC sensor to the first value.

4. The method of claim 1, wherein the calculating the thermal resistance of the NTC sensor includes:

determining the thermal resistance of the NTC sensor by applying a temperature reflection rate to the thermal resistance of the power module, wherein the temperature reflection rate depends on a ratio between the temperature variation of the NTC sensor and a junction temperature variation of the power module, measured after heating of the at least one semiconductor switching element while a temperature of a coolant is fixed.

5. The method of claim 1, wherein the predicting the temperature of the heat sink includes:

determining the temperature of the heat sink by applying an impedance of a coolant in the heat sink to the difference between the temperature of the power module and the temperature variation of the NTC sensor.

6. An apparatus of predicting a temperature of a heat sink for cooling a power module including at least one semiconductor switching element and a Negative Temperature Coefficient of Resistance (NTC) sensor, the apparatus comprising:

an NTC temperature variation calculator that is configured to calculate a thermal resistance of the power module using parasitic diode voltages of the at least one semiconductor switching element measured while applying a voltage set to a gate electrode of the at least one semiconductor switching element and increasing a coolant temperature, calculate a thermal resistance of the NTC sensor using the thermal resistance of the power module, select, from among a plurality of thermal resistance compensation values for a plurality of coolant LPMs, a thermal resistance compensation value corresponding to a coolant LPM applied to the power module, and estimate a temperature variation of the NTC sensor using a power loss of the power module based on a power loss occurring in the at least one semiconductor switching element according to driving of the power module and a thermal resistance of the NTC sensor, and the selected thermal resistance compensation value;

an NTC temperature obtainer that is configured to obtain a temperature of the power module detected by the NTC sensor; and a heatsink temperature calculator that is configured to predict the temperature of the heat sink from a difference between the temperature of the power module and the temperature variation of the NTC sensor.

7. The apparatus of claim 6, wherein the NTC temperature variation calculator is configured to determine a first value by applying the thermal resistance compensation value to a second value obtained by multiplying the power loss of the power module and the thermal resistance of the NTC sensor, and to determine the temperature variation of the NTC sensor by applying a thermal impedance of the NTC sensor to the first value.

8. The apparatus of claim 6, wherein the NTC temperature variation calculator is configured to determine the thermal resistance of the NTC sensor by applying a temperature reflection rate to the thermal resistance of the power module, and wherein the temperature reflection rate depends on a ratio between the temperature variation of the NTC sensor and a junction temperature variation of the power module, measured after heating of the at least one semiconductor switching element while a temperature of the coolant is fixed.

9. The apparatus of claim 6, wherein the heatsink temperature calculator is configured to determine the temperature of the heat sink by applying an impedance of a coolant in the heat sink to the difference between the temperature of the power module and the temperature variation of the NTC sensor.

10. A method for measuring a junction temperature of a power module including at least one semiconductor switching element and a Negative Temperature Coefficient of Resistance (NTC) sensor in an apparatus of measuring a junction temperature of a power module, the method comprising:

estimating, by a heat sink temperature predictor of the apparatus, a temperature of a heat sink using a temperature of the power module detected by the NTC sensor and a temperature variation of the NTC sensor;

determining, by a power module temperature variation calculator of the apparatus, a variation of the junction temperature of the power module using a thermal model of the power module; and determining, by a junction temperature calculator of the apparatus, the junction temperature of the power module using the temperature of the heat sink and the variation of the junction temperature of the power module, wherein the estimating, by a heat sink temperature predictor of the apparatus, the temperature of the heat sink includes:

calculating a thermal resistance of the power module using parasitic diode voltages of the at least one semiconductor switching element measured while applying a voltage set to a gate electrode of the at least one semiconductor switching element and increasing a coolant temperature;

calculating a thermal resistance of the NTC sensor using the thermal resistance of the power module;

estimating a temperature variation of the NTC sensor using a power loss of the power module based on a power loss occurring in the at least one semiconductor switching element according to driving of the power module, the thermal resistance of the NTC sensor, and a thermal resistance compensation value of the NTC sensor; and predicting the temperature of the heat sink from a difference between the temperature of the power module and the temperature variation of the NTC sensor.

11. The method of claim 10, wherein the estimating the temperature of the heat sink further includes:

selecting, from among a plurality of thermal resistance compensation values for a plurality of coolant LPMs, the thermal resistance compensation value of the NTC sensor according to a Liter Per Minute (LPM) of a coolant.

12. The method of claim 10, wherein the estimating of the temperature variation of the NTC sensor includes:

determining a first value by applying the thermal resistance compensation value to a second value obtained by multiplying the power loss of the power module and the thermal resistance of the NTC sensor; and determining the temperature variation of the NTC sensor by applying a thermal impedance of the NTC sensor to the first value.

13. The method of claim 10, wherein the estimating the temperature of the heat sink includes:

determining the temperature of the heat sink by applying an impedance of a coolant in the heat sink to a difference between the temperature of the power module and the temperature variation of the NTC sensor.

14. The method of claim 10, wherein the determining the variation of the junction temperature of the power module includes:

determining the variation of the junction temperature of the power module using a power loss of the power module determined based on a power loss generated in the at least one semiconductor switching element according to driving of the power module and a thermal resistance of the power module.

* * * * *